United States Patent [19]

Vander Velden et al.

[11] 4,263,024
[45] Apr. 21, 1981

[54] AIR CLEANING DEVICE

[75] Inventors: Edward L. Vander Velden, Grand Blanc; Gerald D. Erdman, Chesaning, both of Mich.

[73] Assignee: Venturmation, Inc., Grand Blanc, Mich.

[21] Appl. No.: 83,288

[22] Filed: Oct. 10, 1979

[51] Int. Cl.³ ................... B01D 47/00; B03C 3/00
[52] U.S. Cl. ..................... 55/122; 55/226; 55/228; 55/257 PV; 261/DIG. 54; 261/DIG. 56; 261/112; 239/565
[58] Field of Search ......... 55/226, 228, 122, 257 PV, 55/240, 241, 126, 235; 261/DIG. 54, DIG. 56, 110, 112; 239/565

[56] References Cited

U.S. PATENT DOCUMENTS

| | | | |
|---|---|---|---|
| 3,347,024 | 10/1967 | Dock et al. | 261/DIG. 54 |
| 3,811,252 | 5/1974 | Evans et al. | 55/241 |
| 4,002,441 | 1/1977 | Johnson | 55/241 |
| 4,165,973 | 8/1979 | Stergiou | 55/241 |

OTHER PUBLICATIONS

Dyna-Vent-Sly Scrubber Catalog 401, Sly Mfg. Co., Strongsville, Ohio, dtd. 777, pp. 1-4.

*Primary Examiner*—Bernard Nozick
*Attorney, Agent, or Firm*—Gifford, VanOphem, Sheridan & Sprinkle

[57] ABSTRACT

An improved air cleaning device is provided for removing solid particulate matter from a contaminated air stream. The air cleaning device comprises a main housing having an air inlet and an air outlet. The air cleaning device further includes a wash section having a tubular housing with its upper end forming the contaminated air inlet and its lower end being open to the interior of the housing. A wash liquid disperser adjacent the upper end of the wash section housing injects a wash fluid into the contaminated air stream, while a venturi downstream from the dispenser accelerates the contaminated air stream now intermixed with the wash liquid downwardly through the wash section housing. The venturi comprises a pair of baffles each having an upper edge portion, a lower edge portion and forming a convex surface therebetween. The baffles are attached to facing walls in the wash section housing and so that the convex surface of the baffles face or protrude toward each other. The upper edge portion of each baffle is attachable to one of a plurality of longitudinally spaced baffle support brackets secured to the wash section housing. The lower edge portion of at least one baffle, and preferably both baffles, is secured to the wash section housing by means of a threaded connector which is pivotally connected at one end to the wash section housing and at its other end is connected to the lower edge portion of the baffle. The lower edge portion of the baffles is thus laterally adjustable between an extended position, in which the lower edge portion of the baffle is spaced outwardly away from its associated wash section housing wall and a retracted position in which the baffle lower edge portion is closely adjacent its associated wash section housing wall. The lateral adjustment of the lower edge portion of the baffle simultaneously pivots the baffle around its upper support bracket and thus variably adjusts the minimum width of the venturi section.

7 Claims, 6 Drawing Figures

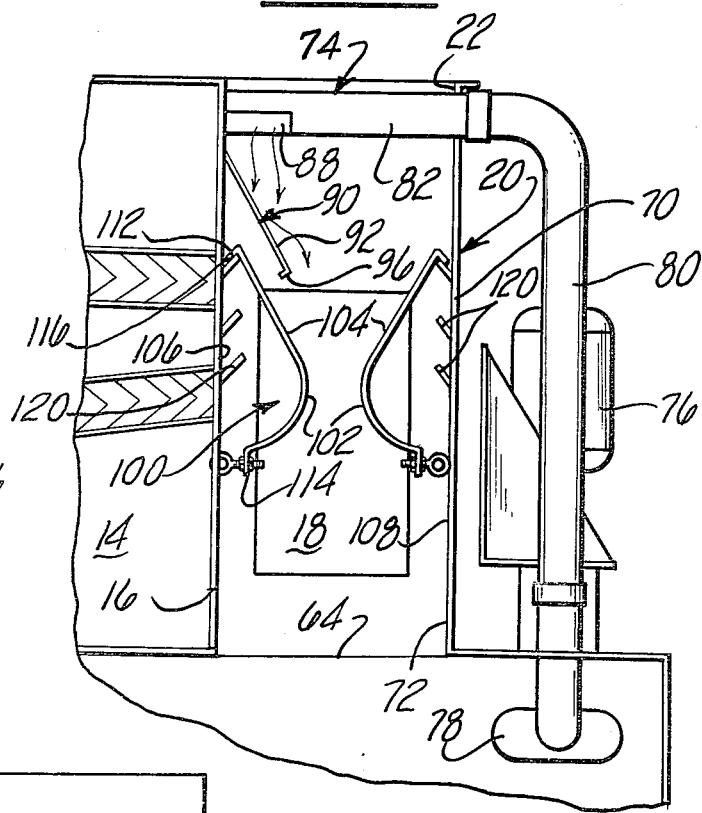
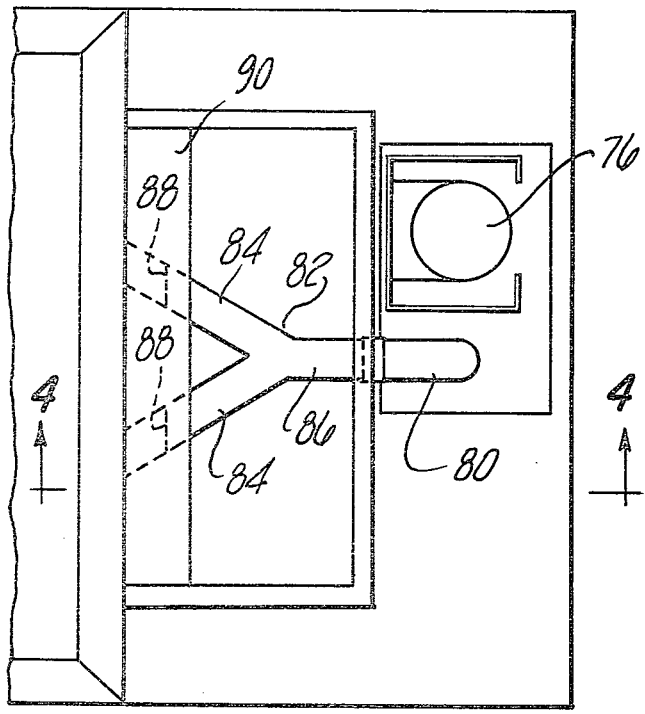
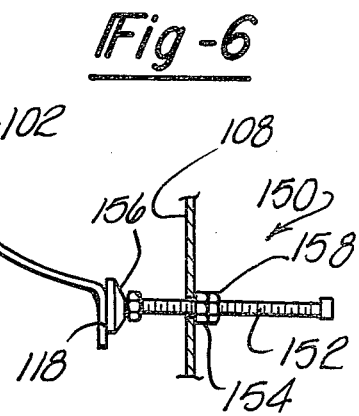

AIR CLEANING DEVICE

BACKGROUND OF THE INVENTION

I. Field of the Invention

The present invention relates generally to air cleaning devices and, more particularly, to an air cleaning device having a wash section with an improved adjustable venturi.

II. Description of the Prior Art

There are a number of air cleaning devices, oftentimes called air scrubbers, which disperse a wash fluid into an air stream contaminated with particulate matter and thereafter collect the wash liquid which is impregnated with the particulate matter. These air scrubbers typically comprise a main housing having a wash liquid reservoir formed along their bottom and having a closed interior which is open at one end to an air outlet. The air scrubber further includes a wash section means having a tubular housing with one end forming an inlet for receiving a contaminated air stream and having an outlet which is open to the interior of the main housing. A fan inducts the air from the wash section air inlet into the housing air outlet. Moreover, the wash section housing is vertically disposed so that the air stream inducted into the wash section housing flows toward the reservoir.

A wash liquid dispersing means is provided adjacent the air inlet in the wash section housing for dispersing a wash liquid into the contaminated air stream. The particulate matter contained within the contaminated air stream becomes intermixed with the wash liquid, and a venturi downstream from the wash liquid dispersing means then accelerates the contaminated air stream toward the reservoir. The relatively heavy wash liquid with the now dissolved particulate matter thus enters the reservoir due to momentum while the relatively lighter and now cleaned air enters into the interior of the main housing and is exhausted from the air outlet means.

One disadvantage of these previously known air scrubbers, however, is that the dimensions of the venturi section are either preset or, at the best, only crudely adjustable. For different air cleaning applications, however, the venturi section must be properly adjusted for maximum cleaning efficiency of the air scrubber. Consequently, with these previously known air scrubbers in which the venturi section is preset or only crudely adjustable, the maximum air cleaning efficiency of the air scrubber is not obtained.

SUMMARY OF THE PRESENT INVENTION

The present invention overcomes the above mentioned disadvantage of the previously known air scrubbers by providing an air scrubber with an adjustable venturi and in which the venturi can be infinitely variably adjusted.

In brief, the air scrubber according to the present invention comprises a main housing having a reservoir formed along its bottom and having a closed interior open to an air outlet. A wash section means comprising a vertically aligned tubular wash section housing is also provided having an inlet for receiving a contaminated air flow and having an outlet open to the closed interior of the main housing. A wash liquid dispersing means is positioned within the wash section housing adjacent the air inlet means for intermixing the wash liquid with the contaminated air. A venturi means is then disposed downstream from the wash liquid dispersing means and within the wash section housing for accelerating the contaminated air stream now intermixed with the wash liquid toward the reservoir.

The novelty of the instant invention resides in the construction of the venturi means which comprises a pair of baffles adjustably secured on opposite walls on the wash section housing. Each baffle includes includes a convex surface which faces or protrudes outwardly towards the convex surface on the other baffle to form the venturi.

Each baffle includes an upper edge portion having an internal flange which is attachable to one of a number of baffle support brackets secured within the interior of the wash section housing. The baffle support brackets are vertically spaced apart from each other along the wash section housing so that the position of the venturi can be vertically varied within the interior of the wash section housing by selectively connecting the upper edge portion of the baffle to different baffle support brackets. Moreover, the baffles can pivot about their upper attachment to the bracket supports.

The lower edge portion of the baffle is, in turn, adjustably connected to the wash section housing wall by means of an elongated threaded connector. The threaded connector is pivotally secured at one end to the wash section housing wall and, at its other end, extends through an aperture in the lower edge portion of the baffle. A pair of lock nuts are threaded to the connector on opposite sides of the baffle lower edge portion which, upon tightening, lock the lower edge portion of the baffle to the threaded connector at any desired adjusted position. In this fashion, the lower edge portion of the baffle can be adjustably secured between an extended position in which the lower edge portion of the baffles is spaced outwardly from the wash section housing wall and a retracted position in which the lower edge portion of the baffle is closely adjacent its associated housing wall. Adjustment of the lower edge portion of the baffle between its retracted and to its extended position in turn adjustably restricts the venturi passage.

In the preferred form of the invention, the air scrubber further includes an electrostatic precipitator which is mounted to the main housing clean air outlet. The electrostatic precipitator is used to remove residual, small micron particles remaining in the air stream. Thus, the combination of the wet scrubber and the electrostatic precipitator minimizes the energy consumption required to provide a specific level of cleaning efficiency by allowing the most effective use of both types of cleaning devices, i.e. the electrostatic precipitator and the wet scrubber. Moreover, since the wet scrubber removes the larger contaminates from the air stream, this extends the time interval of the maintenance cycle for the electrostatic precipitator.

As a further improvement, the present invention preferably uses a cyclonic filter to clean the solid particulate matter of about 5-10 microns in size from the wash liquid contained in the fluid reservoir. The cyclonic filter thus reduces the dumping cleaning cycle of the wash liquid in the reservoir by keeping the wash liquid internally cleaner and permits more efficient operation of the wet scrubber.

The present invention also preferably provides an improved method for skimming oil from the wash liquid in the reservoir. In brief, the air scrubber utilizes a pump in conjunction with an overflow weir to create a positive transfer of the surface contaminates from the reservoir into a calm or quiet collection tank. Oil and other floating particulate can then be collected from the surface of the fluid in the quiet area by conventional belt and/or rope skimmers.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 3 is a side view illustrating the venturi section of the air cleaning device according to the present invention and enlarged for clarity;

FIG. 4 is a fragmentary view taken substantially along line 4—4 in FIG. 3;

FIG. 5 is a fragmentary view showing the means for adjustably connecting the lower edge of the baffle to the housing and enlarged for clarity; and FIG. 6 is a view similar to FIG. 5 but showing a modification thereof.

DETAILED DESCRIPTION OF THE PRESENT INVENTION

Figure 1:
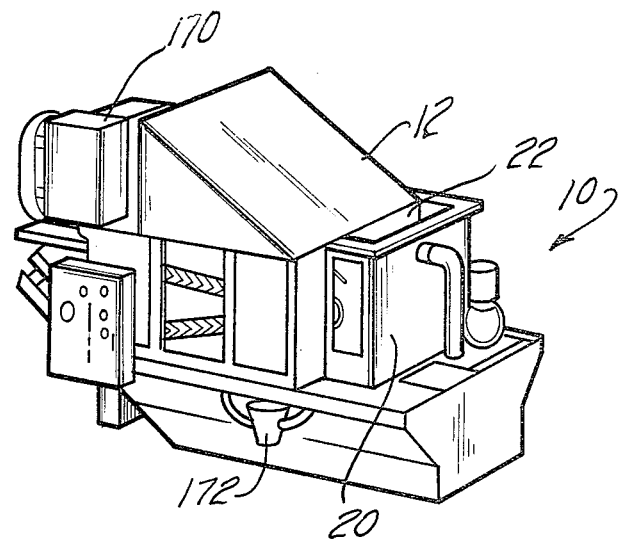
FIG. 1 is a perspective view illustrating the air cleaning device according to the present invention.
Figure 2:
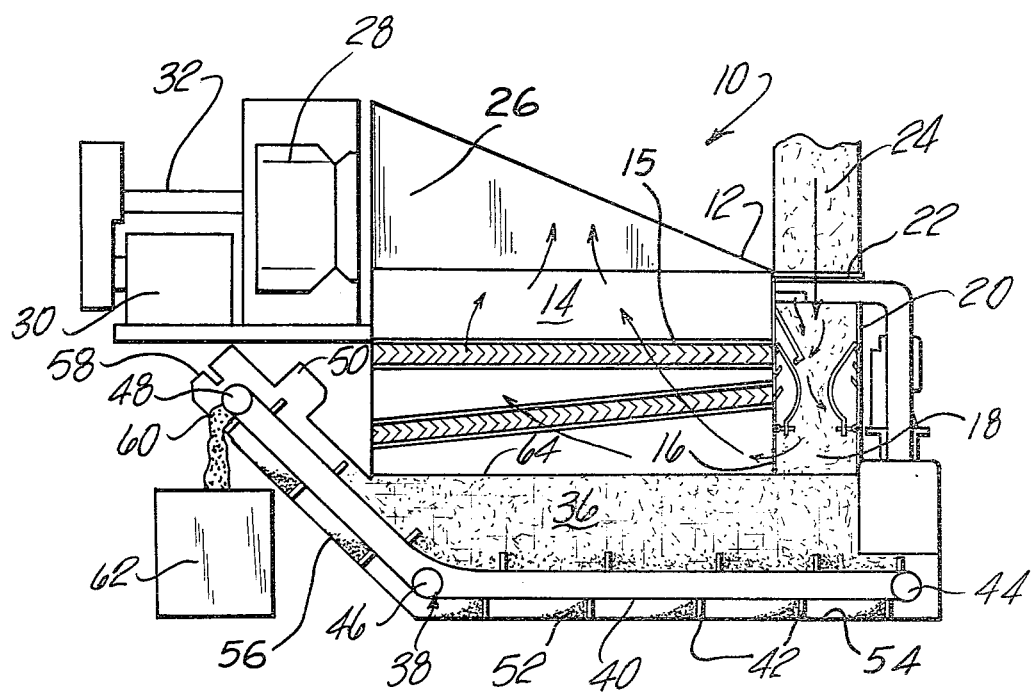
FIG. 2 is a sectional view illustrating the air cleaning device according to the present invention.

With reference first to FIGS. 1 and 2, the air cleaning device or air scrubber 10 according to the present invention is thereshown and comprises a main housing 12 having an interior chamber 14. The housing chamber 14 is open through a rectangular opening 16 to the interior 18 of wash section housing 20 at the lower end of the wash section housing 20. The opposite and upper end 22 of the wash section housing 20 is open and forms an inlet for receiving air 24 contaminated with particulate matter. The housing 12 also includes an outlet 26 for exhausting clean air from the air cleaning device 10 while an induction fan 28 rotatably driven by a motor 30 via a transmission means 32 inducts air from the inlet 22, through the interior 18 of the wash section housing 20, the interior chamber 14 of the main housing 12 and out through the exhaust opening 26.

Referring now to FIG. 2, the lower portion 34 of the main housing 12 forms a fluid reservoir 36 for containing a wash liquid, such as water. A sludge conveyor 38 is at least partially positioned within the reservoir 36 and comprises an endless conveyor chain 40 having a plurality of longitudinally spaced and laterally extending wiper blades 42 secured to it. The chain 40 is mounted on rollers 44, 46 and 48 and is longitudinally driven by means of a motor 50 mounted to the housing 12. Upon activation of the motor 50, the wiper blades 42 contact and scrape particulate matter 52 resting on the bottom 54 of the reservoir 36 and drag the particulate matter 52 up through an upwardly extending portion 56 of the housing 12. The particulate matter 52 collected by the wiper blades 42 is sequentially dumped through an opening 60 near the upper free end 58 of the upwardly extending housing portion 56 into a suitable receptacle 62 for disposal. The fluid level 64 of the reservoir, however, is maintained at a sufficiently high level to isolate the main housing interior chamber 14 from the opening 60.

With reference now particularly to FIGS. 3 and 4, the wash section housing 20 is thereshown in greater detail and comprises a rectangular and vertically oriented tubular housing 70 having the open upper end 22 which forms the inlet for the contaminated air flow and also open at its lower end 72 to the rectangular opening 16. A wash liquid dispersing means 74 is provided for dispersing the wash fluid within the interior 18 of the wash section housing 70 and adjacent its upper end 22. The wash liquid dispersing means 74 further comprises a pump 76 having a submerged inlet 78 and which, upon activation, pumps the wash liquid from the reservoir 36 and into an outlet conduit 80. The conduit 80 in turn is connected to a Y-shaped conduit 82 which extends laterally across the interior 18 of the wash section housing 70 and adjacent its upper end 22. The Y-shaped conduit 82 has two diverging legs 84 and a base leg 86 which receives the liquid output from the conduit 80. Moreover, an opening 88 is formed on the lower side of each diverging section 84 of the Y-shaped conduit and near its free end so that upon activation of the pump 76, the wash fluid is pumped from the reservoir 36 and out through the openings 88 in the Y-shaped conduit 82.

A wash liquid distributor 90 is positioned beneath the Y-shaped conduit 82 in order to distribute the wash liquid across the interior of the housing 70. The distributor 90 comprises a rectangular plate 92 secured at an upper longitudinal edge to the wash section housing 70 and extending downwardly at an angle of approximately 30 degrees. In operation, the wash liquid drops downwardly from the Y-shaped connector 82 onto the plate 92 which distributes the wash liquid across the entire plate 92 so that a planar sheet of wash liquid exits from the lower edge 96 of the plate 92.

A venturi means 100 is also provided within the interior of the wash section housing 70 and downstream from the distributor plate 92. The venturi 100 comprises a pair of baffles 102 which are preferably constructed of sheet metal and have a convex outer surface 104. The baffles 102 are attached to opposite walls 106 and 108 of the wash section housing 70 and form a venturi passageway therebetween.

Each of the baffles 102 is generally rectangular in shape, when viewed in plan, thus having an upper edge portion 112 and a lower edge portion 114. The upper edge portion 112 further includes an inturned flange 116 while the lower edge portion 114 includes a downwardly depending flange (FIG. 5). The flanges 116 and 118 preferably extend laterally across the entire width of the baffle 102.

A plurality of longitudinally spaced and laterally extending baffle support brackets 120 are secured along the opposing walls 106 and 108 of the wash section housing 70. Each bracket 120 extends upwardly from its wall 106 or 108 so that the inturned flange 116 at the upper end of the baffle 102 can be positioned over and supported by the bracket 120. Moreover, the baffle 102 can pivot about the bracket 120.

With reference now particularly to FIG. 5, a unique fastener 122 is thereshown for securing the lower edge portion 114 of the baffle 102 to its associated wall 106 or 108. The fastener 122 comprises an eye portion 124 and a threaded shank 126 which extends outwardly from the eye portion 124 and through an aperture formed through the downwardly depending flange 118 of the baffle 102. The eye portion 124 of the fastener 122 is pivotally mounted to one of a plurality of spaced studs 130 spaced along the wash section housing walls 106 and 108. In addition, a pair of nuts 132 are threadably mounted on the shank 126 so that one nut 132 is positioned on each side of the flange 118.

The fastener 122 enables the lower edge portion 114 of the baffle 102 to be variably adjustably positioned with respect to its associated housing wall 106 or 108 between an extended position, illustrated in phantom line in FIG. 5, and a retracted position, illustrated in solid line in FIG. 5, by simply adjusting the nuts 132 along the shank 126 and with the flange 118 sandwiched therebetween. With the baffle 102 in its extended position, the minimum width of the venturi is reduced, while, conversely, with the baffle 102 in its retracted position the minimum width of the venturi passage 110 is maximized. Moreover, the position of the baffle 102 is infinitely variably adjustable between its retracted and its extended position and the eye portion 124 of the connector 120 permits the shank 126 to pivot to compensate for the pivotal arc of the baffle 102.

A modification of the connector 122 is illustrated in FIG. 6 as a connector 150 having an elongated threaded shank 152 which threadably engages a threaded member 154 secured to the wash section housing wall 108. A disc 156 secured to one end of the shank 152 abuts against the flange 118 on the baffle 102 so that rotation of the shank 152 in turn infinitely variably adjusts the position of the lower edge portion 114 of the baffle 102 between an extended and a retracted position. When properly adjusted, a pair of lock nuts 158 are provided on the shank 152 to lock the connector 150 to the housing wall 106 or 108 in its adjusted position.

Although the operation of the air cleaning device 10 should be apparent to those skilled in the art, it will be summarized for the sake of clarity. With reference to FIG. 2, the activation of the motor 30 in turn rotatably drives the fan 28 which inducts the contaminated air stream 24 into the inlet 22 of the wash section housing 70. Simultaneously, the pump 76 pumps the wash fluid up through the Y-shaped connector and down onto the distributor plate 92 whereupon the wash liquid becomes intermixed with the incoming contaminated air stream. The contaminated air stream now intermixed with the water is inducted downwardly through the wash section housing 70 and this downward travel is further accelerated by the venturi section formed by the baffles 102. The wash liquid with its now dissolved particulate matter from the contaminated air stream 24 then enters the reservoir 36 from momentum while the cleaned air stream passes through the rectangular opening 16, through the interior 14 of the main housing 12 and out through the clean air outlet 26 of the main housing 12. Conventional air dryers 15 in the interior 14 of the housing 12 further dries the cleaned air. The particulate matter collected in the reservoir 36 is continuously moved by the conveyor means 38 in the previously described fashion.

For maximum efficiency, the venturi section formed by the two baffles 102 must be carefully adjusted in order to obtain the maximum cleaning efficiency. With the present invention, this is easily accomplished by the adjustment of the connectors 122 or 150. Moreover, since the connectors 122 or 150 can be infinitely variably adjusted, the venturi configuration for the maximum cleaning efficiency can be obtained by proper adjustment.

With reference now to FIG. 1, preferably the air cleaning device 10 according to the present invention further includes an electrostatic precipitator 170 which is fluidly disposed across the clean air outlet 26 from the main housing 12. The electrostatic precipitator 170 is used to remove the residual smaller micron particles which remain in the air stream despite the wet scrubbing cleaning operation. The combination of the wet scrubber with the electrostatic precipitator is advantageous in that it reduces the energy consumption required to provide a specific overall level of cleaning by allowing the most effective use of both the wet scrubbing cleaning device and the electrostatic precipitator. Moreover, since the wet scrubbing cycle removes most, if not all, of the larger sized particles from the air stream, the maintenance interval for cleaning the electrostatic precipitator can be substantially increased in comparison with an air cleaning device which is not used with a wet scrubber.

Still referring to FIG. 1, preferably a cyclone cleaner 172 is used to continuously clean the wash liquid in the reservoir 36. The cyclone cleaner removes solid particulates ranging in size from five to ten microns from the reservoir and thus reduces the dumping and cleaning cycle by keeping the wash liquid internally cleaner.

From the foregoing, it can be seen that the air cleaning device 10 according to the present invention provides a novel device for industrial air cleaning applications and in which the venturi section of the air cleaner can be accurately adjusted as required for maximum efficiency of the overall air cleaning system. Moreover, the combination of the electrostatic precipitator with the wet scrubber enables the most effective use of both the wet scrubber and the electrostatic precipitator for maximum cleaning efficiency and minimum energy consumption requirement. A cyclonic filter is also advantageous in that it reduces the overall cleaning and dumping cycle of the reservoir 36.

Having described our invention, however, many modifications thereto will become apparent to those skilled in the art to which it pertains without deviation from the spirit of the invention as defined by the scope of the appended claims.

We claim:

1. An apparatus for removing solid particulate matter from a contaminated air stream comprising:
   a main housing, said main housing having an air inlet means for receiving the contaminated air stream;
   wash section means for receiving the contaminated air stream and for removing solid particulate matter from the contaminated air stream thus forming a clean air stream;
   said main housing having an outlet for exhausting the clean air stream;
   means for inducting air from said inlet and to said outlet;
   wherein said wash section means further comprises:
   a tubular and rectangular wash section housing open at one end to the housing inlet and at its other end to the housing outlet;
   means for dispersing a wash liquid into the contaminated air stream near said one end of the housing;
   a pair of baffles, each baffle having a convex surface with an upper and lower edge, the upper edge of each baffle being secured to facing walls of the wash section housing downstream from the wash liquid dispersing means so that the convex surfaces face each other and form a venturi therebetween;
   means for adjustably securing the lower edge of at least one baffle to its respective wash section housing wall between an extended position in which the lower edge of said at least one baffle is spaced outwardly from its respective housing wall and a retracted position in which the lower edge of said at least one baffle is closely adjacent its respective housing wall and wherein said dispersing means further comprises a generally rectangular distributor plate having one longitudinal edge secured to said wash section housing above one of said baffles, said distributor plate extending downwardly toward said venturi, said dispersing means further comprising a Y-shaped conduit having a base leg and two diverging legs and an opening in each diverging leg, said conduit positioned in said wash section housing so that said openings in said diverging legs are disposed above said distributor plate and longitudinally spaced from each other along the distributor plate, and means pumping said wash liquid into said conduit base leg and out through said openings whereby a planar sheet of wash liquid exits from the other longitudinal edge of the distributor plate.

2. The invention as defined in claim 1 wherein said air scrubber housing includes a reservoir for collecting said wash liquid and wherein said apparatus further comprises means for removing solid particulate matter of between five and ten microns in size from the wash liquid in the reservoir.

3. The invention as defined in claim 1 and including an electrostatic precipitator having an inlet fluidly connected to the main housing air outlet.

4. The invention as defined in claim 1 wherein said adjustable securing means further comprises means for infinitely variably adjustably securing the lower edge of said at least one baffle to said wash section housing between said extended and said retracted position.

5. The invention as defined in claim 2 wherein said adjustable securing means further comprises an elongated threaded shank, means for attaching one end of the shank to said at least one wash section housing wall so that the shank protrudes toward the interior of the wash section housing, and means for securing the lower edge of said at least one baffle to said shank at an infinitely variable adjusted position.

6. The invention as defined in claim 5 wherein said means for securing said shank to said housing wall further comprises means for pivotally securing said end of said shank to said housing wall about an axis substantially parallel to the lower edge of said at least one baffle.

7. The invention as defined in claim 5 wherein the lower edge of said at least one baffle comprises a downwardly extending flange having an aperture formed therethrough and through which the shank extends and wherein said means for adjustably attaching said shank to said at least one baffle further comprises a pair of nuts threadably mounted on said shank on opposite sides of the flange so that, upon tightening, said nuts sandwich the flange therebetween.

* * * * *

UNITED STATES PATENT AND TRADEMARK OFFICE
CERTIFICATE OF CORRECTION

PATENT NO. : 4,263,024
DATED : April 21, 1981
INVENTOR(S) : Edward L. Vander Velden and Gerald D. Erdman It is certified that error appears in the above-identified patent and that said Letters Patent are hereby corrected as shown below:

In the Abstract, Column 1, line 4, delete "and an air outlet.";

In the Abstract, Column 1, line 4, after "inlet", insert --for receiving the contaminated air stream and an air outlet for exhausting the cleaned air from the main housing.--;

In the Abstract, Column 2, line 9, after "housing", insert --Due to its high momentum the wash liquid then collected within a reservoir formed in the bottom of the main housing while the cleaned air stream is exhausted into the interior of the main housing and out through the housing outlet. The novelty of the instant invention, however, resides in the construction of the venturi in the wash section housing.--;

Column 4, line 48, after "flange", insert --118--.

Signed and Sealed this

Twenty-fifth Day of August 1981

[SEAL]

Attest:

Attesting Officer

GERALD J. MOSSINGHOFF

Commissioner of Patents and Trademarks